United States Patent [19]

Hoshi

[11] 4,301,780
[45] Nov. 24, 1981

[54] FUEL INJECTION CONTROL APPARATUS FOR INTERNAL COMBUSTION ENGINE

[75] Inventor: Yoshikazu Hoshi, Ibaraki, Japan

[73] Assignee: Hitachi, Ltd., Tokyo, Japan

[21] Appl. No.: 56,427

[22] Filed: Jul. 10, 1979

[30] Foreign Application Priority Data

Jul. 21, 1978 [JP] Japan ................................. 53-88442

[51] Int. Cl.³ ...................... F02M 52/00; F02D 5/02; F02B 33/00; F02B 3/00
[52] U.S. Cl. .................... 123/486; 123/295; 123/480; 123/478; 123/483
[58] Field of Search .... 123/32 EA, 32 EG, 139 AW, 123/139 E, 117 R, 117 D, 295, 445, 472, 478, 479, 480, 483, 486

[56] References Cited

U.S. PATENT DOCUMENTS

| | | | |
|---|---|---|---|
| 3,835,819 | 9/1974 | Anderson, Jr. ................. | 123/117 D |
| 3,893,434 | 7/1975 | Thatcher et al. ............... | 123/32 EA |
| 4,069,795 | 1/1978 | Long et al. ...................... | 123/483 |
| 4,142,683 | 3/1979 | Carey et al. ................... | 123/32 EA |
| 4,153,014 | 5/1979 | Sweet .............................. | 123/32 EG |
| 4,184,460 | 1/1980 | Harada et al. ................. | 123/32 EA |
| 4,188,921 | 2/1980 | Grimmer ........................ | 123/32 EA |
| 4,200,063 | 4/1980 | Bowler ............................ | 123/478 |
| 4,201,159 | 5/1980 | Kawai et al. ................... | 123/32 EA |
| 4,235,204 | 11/1980 | Rice ................................. | 123/480 |

*Primary Examiner*—Raymond A. Nelli
*Attorney, Agent, or Firm*—Craig and Antonelli

[57] ABSTRACT

An internal combustion engine having a plurality of cylinders is provided with a fuel supply system of a single point injection type, a fuel supply control apparatus controls at least one of operation initiating timing and operating duration of a fuel injection valve for at least one of the cylinders independently from the other cylinders, to thereby optimize the distribution of fuel supply to each of the cylinders.

20 Claims, 9 Drawing Figures

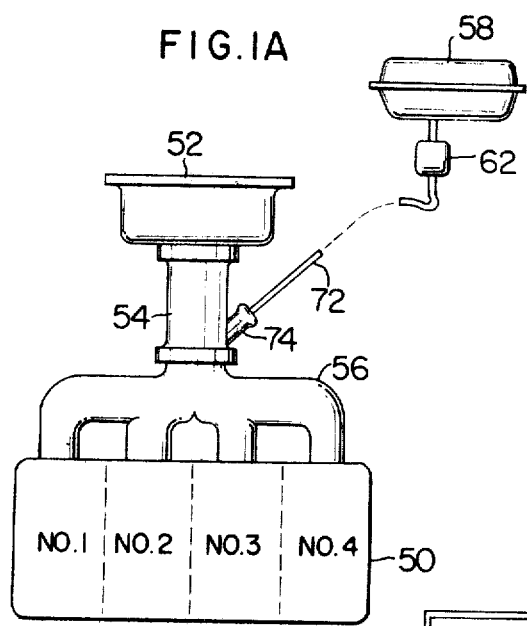
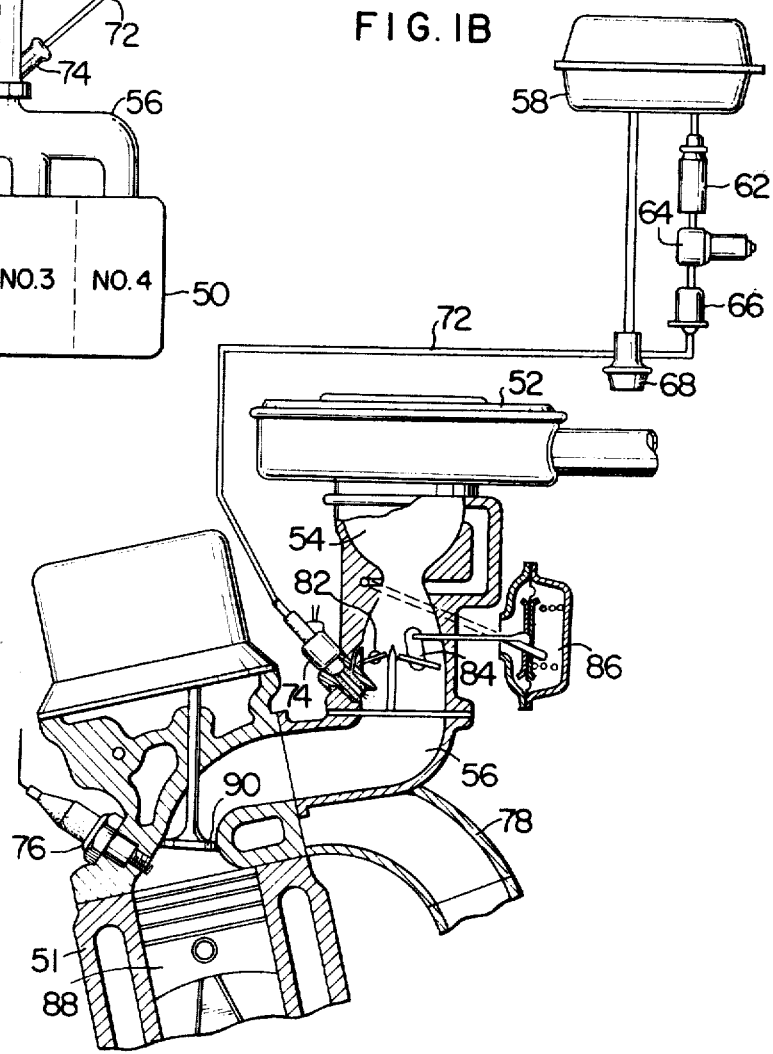

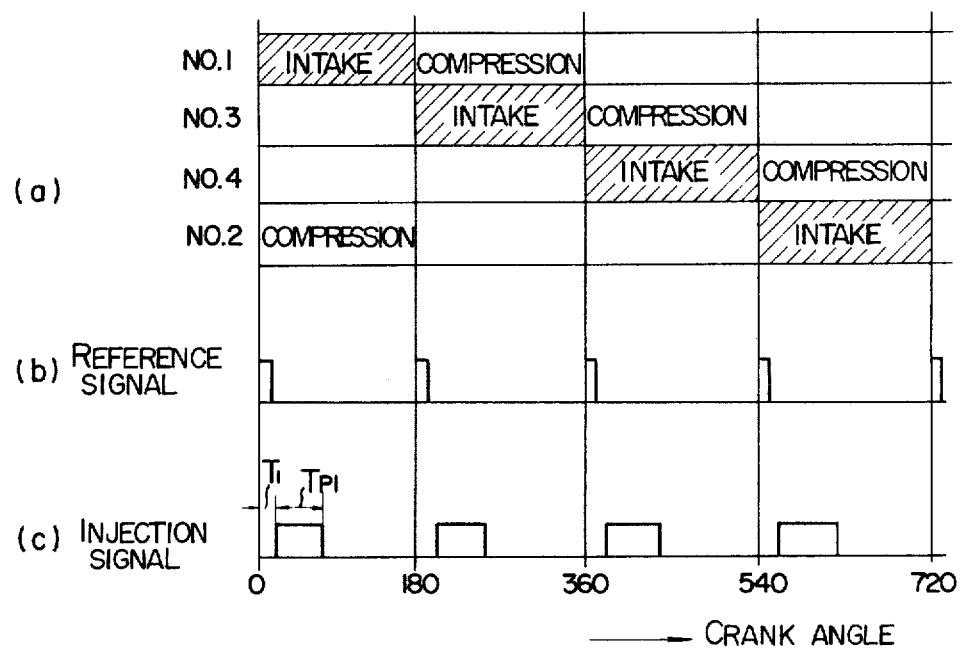

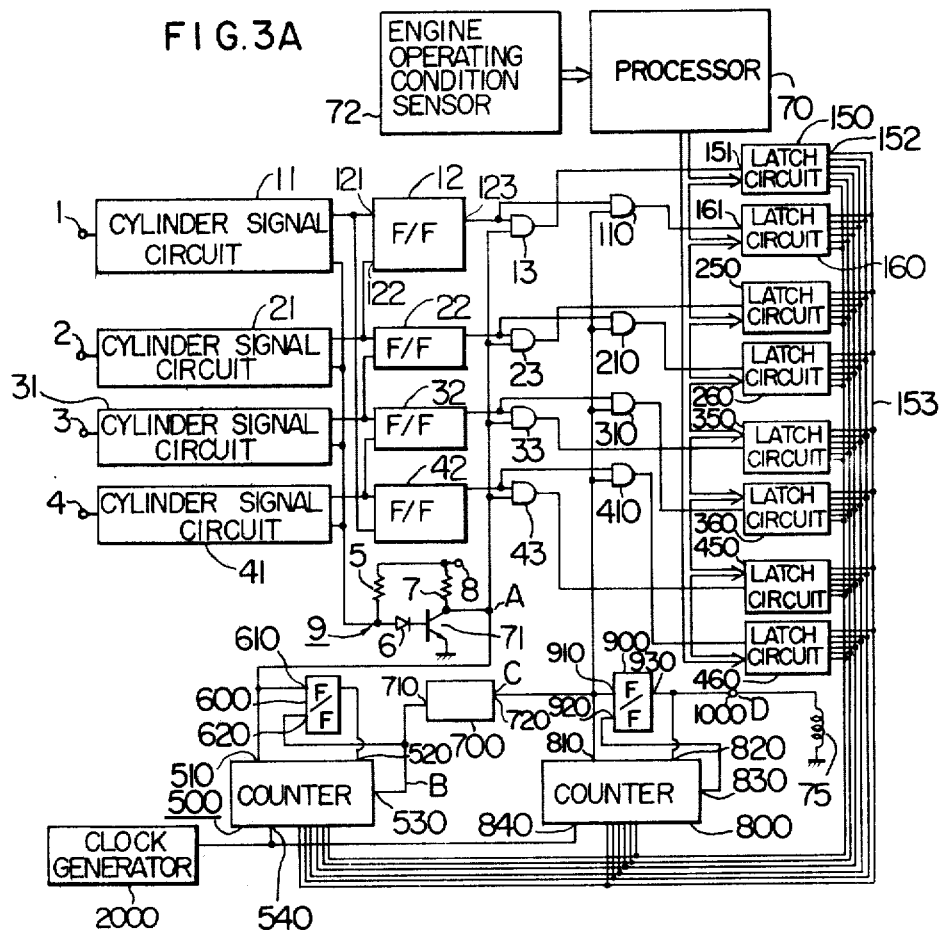
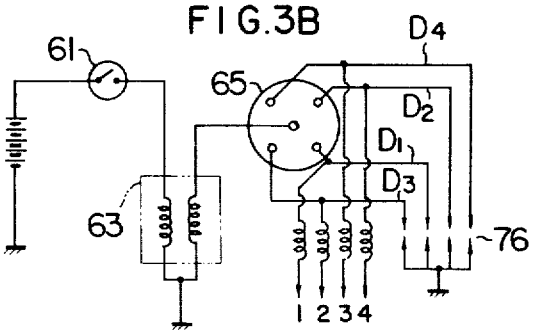

000
FUEL INJECTION CONTROL APPARATUS FOR INTERNAL COMBUSTION ENGINE

The present invention relates generally to an optimum fuel supply control apparatus for an internal combustion engine having a plurality of cylinders, and more particularly to a fuel supply control apparatus for controlling fuel distribution to the cylinders of an internal combustion engine of the type in which the fuel is supplied through a single fuel injection valve.

In the fuel supply system for a spark ignition type multicylinder engine, it has been hitherto known and practically adopted to dispose an electromagnetic valve in the vicinity of an intake valve for each of the cylinders to control the quantity of fuel injected into the associated cylinder by controlling the operating duration of the electromagnetic valve driven in synchronism with the rotation of the engine. The fuel supply system of this type is advantageous in that a quantity of fuel as required by the engine, which is usually a function of various operating parameters of the engine, can be precisely controlled by utilizing an electrical control device which can be wholly electrically and electronically implemented in a relatively compact arrangement by resorting to highly advanced electronic techniques. However, the fuel supply control apparatus of this type suffers from drawbacks in respect of complicated piping and high expense involved because of the fact that the electromagnetic fuel injection valves must be provided individually for the cylinders.

As an attempt to solve the above difficulty, a so-called single point injection apparatus has been proposed in which a single fuel injection valve of the electromagnetic or solenoid type is provided at a common air intake portion leading to a plurality of engine cylinders, wherein the fuel is supplied into the air intake portion in synchronism with the operations of the cylinders, and distributed to the individual cylinders along with the air flow thereto.

More specifically, the fuel supply to the air intake portion is initiated, for example, in synchronism with the spark ignition for the respective cylinder and completed before the ignition timing of the succeeding cylinder and the supplied fuel is automatically fed, together with intake air, to the cylinder which is at the intake stroke at that instant. In the fuel supply apparatus of this type, the most troublesome problem resides in that, due to the difference in configuration and length among the intake passages leading to the individual cylinders and also the difference in density and flowing speed between the fuel and the air, it is difficult to attain an optimum fuel distribution to the individual cylinders.

Accordingly, an object of the present invention is to provide a fuel supply control apparatus for a single injection type fuel supply system of a multicylinder internal combustion engine which is capable of optimizing the fuel distribution to the individual engine cylinders.

By the expressions "optimum fuel distribution", "optimization in fuel distribution" or the like as used herein, it is generally intended to mean that the fuel is distributed uniformly to the individual cylinders of a multicylinder internal combustion engine. However, if a particular cylinder requires a fuel quantity different from those for the other cylinders, the "optimum fuel distribution" indicates such a condition that the fuel supply to the particular cylinder is at a predetermined ratio to those to the other cylinders. The latter case may arises in a system in which a fraction of exhaust gas is subjected to recirculation in order to reduce noxious components contained in the exhaust gas.

According to the present invention, there is provided a fuel supply control system for a multicylinder internal combustion engine which comprises first means for operating the fuel injection valve in synchronism with the fuel intake stroke at every cylinder; second means for controlling at least one of a first control quantity representing the starting time for operation of the fuel injection valve and a second control quantity representing the quantity of fuel injected through the fuel injection valve with respect to at least one of the cylinders independently from such control quantities for the other cylinders.

The above and other objects, novel features and advantages of the present invention will become more apparent from the following description on the exemplary embodiment of the invention taken in conjunction with the accompanying drawings, in which:

FIGS. 1A and 1B show schematically a fuel supply system for a multicylinder internal combustion engine of the single fuel injection type;

FIG. 2 is a timing diagram for illustrating the relationship between the crankshaft rotation angles and fuel injection times in a multicylinder engine;

FIGS. 3A, 3B and 3C show block diagrams of electric circuits used in a fuel supply control apparatus according to the invention;

Figure 3C:
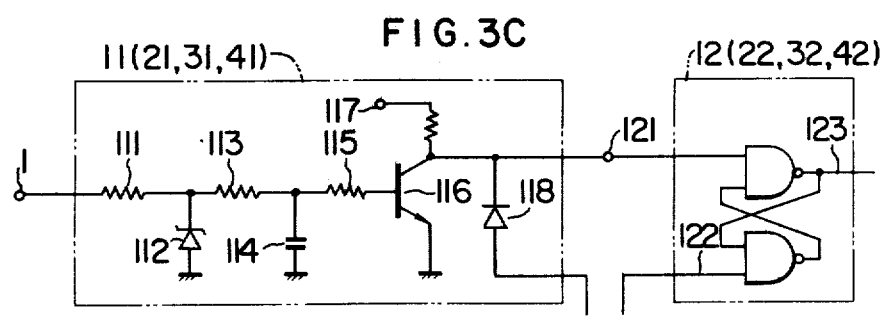

In the first place, referring to FIGS. 1A and 1B, description will be made on a fuel supply system of a multicylinder internal combustion engine of a single injection type to which the fuel supply control apparatus according to the invention can be applied. For convenience, the engine is illustrated as one having four cylinders. FIG. 1A shows schematically a fuel supply system to an engine block 50 having four cylinders labelled by Nos. 1 to 4, while FIG. 1B shows in detail an arrangement of the fuel supply system in connection with one cylinder 51 of the engine 50. Intake air is supplied through an air cleaner 52, a throttle chamber 54 and an intake manifold 56 to individual cylinders of the engine 50. On the other hand, fuel is supplied from a fuel tank 58 by a fuel pump 62 to a pressure regulator 68 through a fuel damper 64 and a filter 66. The fuel pressure regulator 68 is connected through a pipe 72 to a fuel injector 74 provided with a valve which is operated by an electromagnetic coil or solenoid to be opened into the throttle chamber 54. When the solenoid is energized, the injector valve is opened, whereby the pressurized fuel as fed from the pressure regulator 68 is injected into the throttle chamber 54 to be atomized and mixed with the intake air. The fuel-air mixture thus produced then flows through the intake manifold 56 and is introduced into a combustion chamber defined within the cylinder 51, when the intake valve 90 is open, to be subjected to combustion therein. The combustion exhaust gas is discharged outwardly through an exhaust manifold 78.

Within the throttle chamber 54, there are provided throttle valves 82 and 84 in the vicinity of the location at which the injector 84 is opened. The throttle valve 82 is mechanically connected to an acceleration pedal and can be operated by a driver. On the other hand, the throttle valve 84 is resiliently biased by a spring and adapted to be driven by a well known diaphragm apparatus 86 which is operated dependent on the quantity of the intake air, so that the intake passage area formed by the throttle valve 84 varies in accordance with the quantity of the intake air.

The fuel-air mixture supplied through the intake valve 90 is compressed by a piston 88 and undergoes combustion as ignited by a spark produced at an ignition plug 76. The gaseous combustion products are discharged outwardly through an exhaust valve (not shown) and an exhaust pipe 78.

Now, description will be made of the fuel injection timings for the individual cylinders of a four-cylinder internal combustion engine with the aid of the timing diagram shown in FIG. 2. Referring to FIG. 2(a), the hatched areas represent the fuel intake strokes of the individual cylinders in terms of the crank angle. More specifically, the fuel intake strokes appear during crank rotation intervals of 0° to 180°, 180° to 360°, 360° to 540° and 540° to 720°, respectively, for the first (No. 1), third (No. 3), fourth (No. 4) and the second (No. 2) cylinders in this order. Accordingly, in the case of the single injection type fuel supply system, reference signals are produced at time points corresponding to the crank rotating positions or angles of 0°, 180°, 360° and 540°, respectively, as illustrated in FIG. 2(b). In response to these reference signals, fuel injection signals are produced, as shown in FIG. 2(c) to energize the solenoid of the injector 74. Then, the injection valve is opened to allow the fuel to be injected into the throttle chamber for a time interval during which the injection signal continues. The injected fuel is mixed with the intake air to produce the fuel-air mixture, which is then introduced through the intake conduit 56 into the cylinder which is just operating at the intake stroke at that time.

By the way, the intake conduits interconnecting the individual cylinders with the throttle chamber 54 are not the same in configuration and in length thereof, as can be seen from FIG. 1A. Accordingly, the whole quantity of fuel which is injected into the throttle chamber at the intake stroke of the cylinder No. 1, for example, is not always fed to the cylinder No. 1, but some fraction of the injected fuel may stay in the intake manifold and possibly be supplied to the cylinder No. 3 at the succeeding intake stroke thereof. Consequently, the quantity of fuel is not necessarily uniform for all the cylinders even when the duration times of the associated injection signals shown in FIG. 2(c) are selected to be equal to one another. Experimental studies performed by the inventors of the present application show that the quantity of fuel fed into each cylinder in response to the respective injection signal is dependent not only on the duration of the associated injection signal but also on the timing at which the injection signal is produced. According to the invention, therefore, at least one of the generation timing for the injection signal and the duration thereof is controlled according to the fuel intake characteristics of the respective cylinders of the multicylinder internal combustion engine, to thereby assure an optimum fuel supply to the cylinders.

Next, referring to FIGS. 3A, 3B and 3C, description will be made of an embodiment of the fuel supply control apparatus constructed according to the invention by way of example, applied to a four-cylinder engine. In FIG. 3A, reference numerals 11, 21, 31 and 41 denote cylinder signal circuits allotted to the respective four cylinders in the order of ignition timing. The cylinder signal circuits 11, 21, 31 and 41 are provided with input terminals 1, 2, 3 and 4, respectively, which are respectively supplied with the reference signals such as shown in FIG. 2(b) and representing the beginning of the intake stroke of the associated cylinders. Although the reference signals may be generated in response to the angular positions of the crankshaft corresponding to the beginnings of the intake strokes of the individual cylinders, it will be more simple to produce such reference signals by utilizing the ignition signals for the individual cylinders through a circuit shown in FIG. 3B. In this figure, reference numeral 61 denotes a point contact which is opened in synchronism with the ignition time points of the individual cylinders, and 63 denotes an ignition coil, the induced secondary voltage of which is distributed to the ignition plugs of the individual cylinders in the order of ignitions thereof through a distributor 65. In the case of a four-cylinder engine, since the ignition is usually effected in the order of the cylinders No. 1, No. 3, No. 4 and No. 2, four output terminals $D_1$, $D_3$, $D_4$ and $D_2$ of the distributor 65 are connected to the ignition plugs of the cylinders No. 1, No. 3, No. 4 and No. 2, respectively. As is well known, at the individual cylinder, the intake stroke is followed by the compression stroke and the ignition takes place near the end of the compression. Accordingly, the ignition time point for the cylinder No. 1 will substantially coincide with the beginning of the intake stroke in the cylinder No. 4, for example. Thus, the ignition signals for the cylinders No. 1, No. 2, No. 3 and No. 4 may be utilized as the signals corresponding to the beginning of the intake strokes in the cylinders No. 4, No. 3, No. 2 and No. 1, respectively. It will be noted from FIGS. 3A and 3B that the input terminals 1, 2, 3 and 4 of the cylinder signal circuits 11, 21, 31 and 41 are supplied with signals introduced from the ignition signals for the cylinders No. 1, No. 3, No. 4 and No. 2, respectively, as reference signals indicative of the beginnings of the intake strokes in the individual cylinders No. 4, No. 2, No. 1 and No. 3, respectively.

Each of the cylinder signal circuits 11, 21, 31 and 41 can be implemented in a circuit configuration such as shown in FIG. 3C and serves to shape properly the high voltage signals applied to the respective input terminals 1, 2, 3 or 4. An input resistor 111 functions to limit the input current, while its maximum voltage is determined by a zener diode 112. With the limited voltage, the input current is applied to the base of a transistor 116 through a smoothing circuit composed of a resistor 113, a charging capacitor 114 and a base resistor 115, so that the transistor 116 is turned on for a predetermined duration from the ignition time point without being disturbed by oscillatory components contained in the ignition signal current. Since the collector of the transistor 116 is connected to a power supply source (not shown) through a resistor and a terminal 117, the collector potential, then, goes to a low level (hereinafter referred to also as the "L" state). The other cylinder signal circuits 21, 31 and 41 are also constructed in a similar configuration as the circuit 11 shown in FIG. 3C and produce successive outputs of the "L" state. These output signals are supplied to respective cylinder discriminating flip-flop circuits (F/Fs) 12, 22, 32 and 42 as the set inputs therefor and at the same time as the reset inputs for the F/Fs which have been in the set state. The circuit configuration of such a F/F is shown in FIG. 3C in combination with the cylinder signal circuit 11. Of course, other F/Fs can be implemented in a similar circuit configuration.

Assuming that the cylinders No. 1, No. 3, No. 4 and No. 2 are to be ignited in this order, the ignition signals for these cylinders are applied to the cylinder signal input terminals 1, 2, 3 and 4 (FIG. 3A), respectively. For example, at the ignition time point for the cylinder No. 1 and hence at the beginning of the intake stroke in the cylinder No. 4, the "L" state signal is applied to a set input terminal 121 of the cylinder discriminating flip-flop 12 thereby to produce a signal high state or level (hereinafter referred to as "H" state) at the output terminal 123 of F/F 12. In a similar manner, at the ignition time point of the cylinder No. 3, which is next to be ignited, corresponding to the beginning of the intake stroke of the cylinder No. 2, a set input is applied to the set terminal of the second F/F 22 associated with the second cylinder signal circuit 21, while at the same time a reset signal is applied to the reset input terminal 122 of the first cylinder discriminating F/F 12 which has been in the set state, whereby the "L" state is restored at the output terminal 123 of F/F 12. In this manner, the cylinder discriminating F/Fs 12, 22, 32 and 42 are set at the ignition time points of the cylinders No. 1, No. 3, No. 4 and No. 2 or at the beginnings of the intake strokes of the cylinders No. 4, No. 2, No. 1 and No. 3, respectively, and reset at the beginning of the intake strokes of the next cylinders in the order of ignition.

In FIG. 3A, reference numeral 9 designates generally an intake timing detection circuit to produce a detection signal when any one of the cylinders is placed into the intake stroke mode. The intake timing detection circuit 9 includes a transistor 71 having a base supplied with a base current from a current source connection terminal 8 through a resistor 5 and a diode 6. The transistor 71 is usually at the conducting state, so that the potential at its collector A connected to the power supply source through a resistor 7 is usually at the "L" state. However, when the cylinder No. 1, for example, is to be just fired and hence the cylinder No. 4 is in its intake stroke, the base current to the transistor 71 is by-passed through the diode 118 connected to the collector of the transistor 116, whereby the transistor 71 is turned off, resulting in that the collector potential of the transistor 71 goes to the "H" level or state. This occurs when any one of the cylinders is in its intake stroke. The potential state at the collector A of the transistor 71 is illustrated in FIG. 4(A).

The high level ("H" state) signal produced from the detection circuit 9 at the time when any cylinder is in its intake stroke is used as a reference signal for determining the time point at which the fuel supply is to be initiated to the cylinder.

Reference numerals 13, 23, 33 and 43 designate first AND gates which cooperate with associated F/Fs 12, 22, 32 and 42, respectively, to detect which cylinder is in its intake stroke. For example, assuming that the cylinder No. 1 is just to be ignited and hence the cylinder No. 4 is in its intake stroke, the output signal from the cylinder discriminating F/F 12 applied to a first input terminal of the first AND gate 13 goes to the high or "H" level, while the output signal produced from the intake timing detection circuit 9 and applied to a second input terminal of the AND gate 13 also goes to the "H" level, thus resulting in the "H" level output from the AND gate 13, which is then applied to a control terminal 151 of a timing data latch circuit 150. Data concerning the time interval $T_1$ between the generation of the intake timing signal and the actual initiation of the fuel supply for the cylinder No. 4 are supplied from a processor 70, as will be described in detail hereinafter, and stored to be always available to the latch circuit 150. Although the input time data varies with variations in the operating conditions of the engine, as will be described hereinafter, the latch circuit 150 latches the input data stored at the time when an "H" level signal is applied to the control terminal 151 and sends out the latched data through a data bus 153. In a similar manner, the latch circuit 250 responds to an "H" level signal from the AND circuit 23 produced at the time corresponding to the initiation of the intake stroke in the cylinder No. 2, to thereby to latch the data of the fuel injection initiation time point for the cylinder No. 2 available from the processor 70 at that time, to be sent out through the data bus 153. Of course, the other latch circuits 350 and 450 perform similar data transfer operations for the cylinders No. 1 and No. 3. It should however be noted that each of the latch circuits described above is electrically interconnected with the data bus 153 only when the high (H) level signal is applied to its control terminal, to thereby to send out the latched data. Otherwise, the latch circuits remain in the state electrically separated from the data bus 153.

Figure 4:
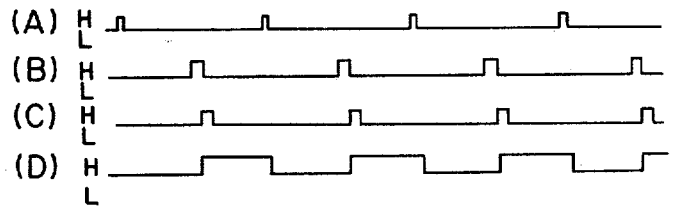
FIG. 4 is a timing diagram illustrating signal wave forms produced at various points in the circuits shown in FIGS. 3A to 3C.

The output signal from the intake timing detection circuit 9, i.e. the intake timing reference signal shown in FIG. 4(A) is applied also to a control terminal 510 of a fuel injection timing counter 500 and a set terminal 610 of a flip-flop circuit (F/F) 600. In response to the intake timing reference signal, the counter 500 latches therein the incoming data through the data bus 153, while F/F 600 is set. The set output from F/F 600 is then applied to the control terminal of the counter 500, to thereby set the counter 500 at the state ready for counting operation. Thus, the counter 500 begins to count the clock pulses applied to the input terminal 540 from a clock generator 2000. The counter 500 receives the time data transmitted through the data bus 153 and stores the data therein. When the counted number of the clock pulses becomes equal to the value of the time data latched therein, the counter 500 produces at the output terminal 530 thereof a signal shown in FIG. 4(B), which is applied to the reset terminal 620 of F/F 600 thereby to cancel the set signal described above. Consequently, the counter 500 stops the counting operation.

Reference numeral 700 denotes a fuel supply initiating circuit which may be constituted by a monostable multivibrator and is adapted to receive at the input terminal 710 thereof the signal output from the output terminal 530 of the counter 500 and produce at the output terminal 720 a pulse signal having a predetermined pulse width or duration such as shown in FIG. 4(C). The pulse signal is utilized for setting F/F 900, to thereby produce a set signal at an output terminal 930, which signal is then applied to the solenoid 76 of the fuel injection valve 74 through a terminal 1000 as a fuel injection signal D to energize the solenoid 75, whereupon the fuel injection is initiated. Further, the output from the circuit 700 is supplied to a second group of AND gates 110, 210, 310 and 410, whereby an output signal is produced by the AND gate connected to the F/F which is at the set state. For example, when the cylinder No. 4 is at the state to enter the intake stroke mode, the output from the cylinder discriminating F/F 12 is at the "H" level, whereby the logic product condition is fulfilled for the second AND gate 110, which is thus enabled to produce the output signal. The output signal from the AND gate 110 is applied to the control terminal 161 of the fuel supply data latch circuit 160. The latch circuit 160 is furnished with the data concerning the quantity of fuel to be supplied to the cylinder No. 4 from the processor 70 in terms of the time interval $T_{p1}$ (FIG. 2(c)) during which the fuel injection valve is opened. Thus, in response to the "H" level signal applied to the control terminal 161, the latch circuit 160 latches the data of the fuel supply quantity available at the time and sends out the latched data through the data bus 153. It should be recalled that the latch circuit 160 is electrically interconnected to the data bus only when the high level signal or "H" state signal is applied to the control terminal. Otherwise, the latch circuit 160 is electrically separated from the data bus 153. Of course, the other latch circuits 260, 360 and 460 function in a similar manner for the cylinders No. 3, No. 1 and No. 2, respectively.

As described hereinbefore, the output signal from the circuit 700 is applied to the set terminal 910 of the flip-flop 900 to set the F/F 900. The set output signal from F/F 900 is applied also to the count control terminal 820 of the counter 800 which is thus set to the state ready for the counting operation and begins to start the counting the clock pulses produced from the clock generator 2000. Additionally, the output signal from the circuit 700 is also supplied to the counter 800 which then receives the incoming data representing the fuel supply quantity transmitted through the data bus 153 and latches the data therein. When the value of the counts in the counter 800 becomes equal to that of the latched fuel supply data, an output signal is produced at the output terminal 830 of the counter 800 to reset F/F 900. Consequently, the set output signal from F/F 900 disappears to stop the counter 800. In this manner, the set output signal of F/F 900 is generated in response to the output signal from the circuit 700, as is shown in FIG. 4(D) and continues until the output signal from the counter 800 is produced. It will be readily appreciated that the duration time of the set output signal of F/F 900 corresponds to the data of the fuel supply quantity sent out from one of the latch circuits 160, 260, 360 or 460 and latched in the counter 800.

Figure 5:
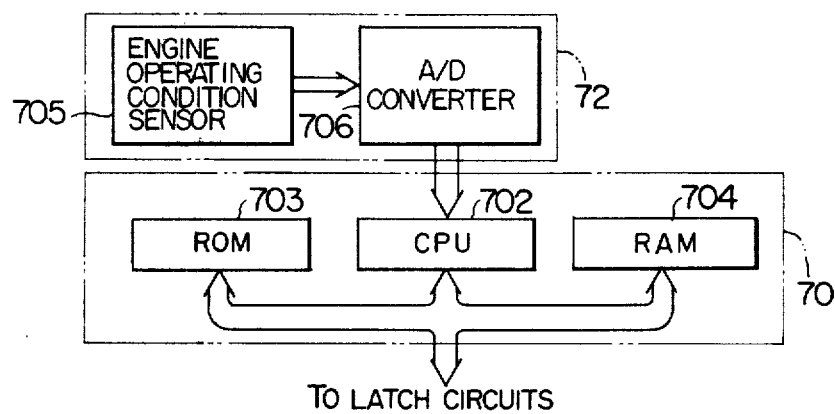
FIG. 5 is a block diagram showing an arithmetic unit shown in FIG. 3A.
Figure 6:
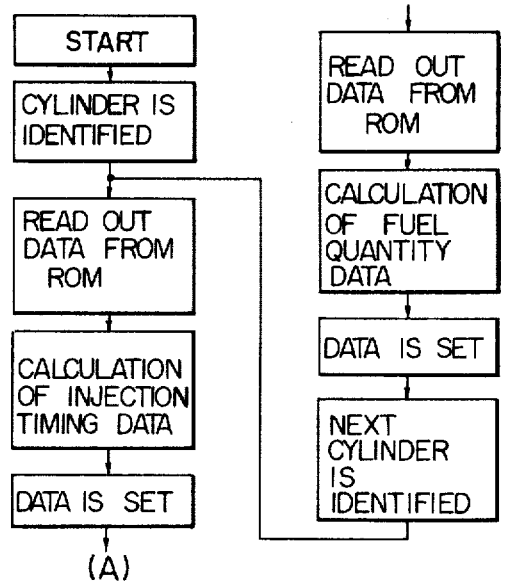
FIG. 6 shows a flow chart for illustrating arithmetic processings executed by an arithmetic operation unit shown in FIG. 5.

Next, description will be made of the arithmetic operation of the processor 70 for preparing the fuel injection timing data and the fuel supply quantity data, with the aid of FIGS. 5 and 6. The processor 70 receives from an engine operating condition sensor unit 72 various signals relevant to the fuel injection timing which may include signals representative of engine speed, the quantity of intake air, the engine cooling water temperature, the opening degree of the throttle valves or the like signals relevant to the engine operating conditions. A desired one or combination of these signals may be utilized as the input signal to the processor 72. On the other hand, relations between these operating conditions and the optimum fuel injection timing and the duration thereof are experimentally determined and stored in a table in ROM (read only memory) 703 incorporated in the processor 70. The engine operating condition sensor unit 72 comprises a set of sensors 705 for producing various signals representative of the predetermined various engine operating conditions and an analog-to-digital (A/D) converter 706 for converting the analog signals produced from the various sensors into corresponding digital or binary signals which are then supplied to the processor 70. The latter will then execute the arithmetic operations through the procedure illustrated in the flow chart of FIG. 6 to process the signals received from the sensor unit 72 by using the stored data table. In the first place, the cylinder of concern is identified. Subsequently, data relevant to the identified cylinder is read out from the table stored in ROM 703 in accordance with the input signals from the sensor unit 72 to calculate the fuel injection timing data, which is then placed into the timing data latch circuit associated with the identified cylinder. Subsequently, the data of the quantity of fuel injection for the identified cylinder is calculated on the basis of the data read out from the table stored in ROM 703 and placed in the fuel supply data latch circuit associated with the identified cylinder. The data processing for the first identified cylinder is thus completed, which is followed by the step for identifying the next cylinder for which the similar data processings are executed. The order of the cylinders to be identified should be preferably the same as the order of the cylinders to be fired. After the completion of data processings for all the cylinders, the first identified cylinder is again picked up and the arithmetic operations described above are repeated to up-to-date the contents loaded in the associated latch circuit. In this manner, each of the individual latch circuits constantly stored therein the updated optimum injection timing data and the updated optimum fuel supply quantity data for the associated cylinder which are calculated on the basis of the fresh data concerning the engine operating conditions.

In the case of the above illustrated embodiment, the fuel injection timing and the fuel supply quantity are independently and separately controlled for the individual cylinders. However, in view of the characteristics of the fuel supply system of concern, it is possible to only control either one of the fuel injection timing or the fuel supply quantity independently for each cylinder, while the other is controlled in common for all the cylinders. Alternatively, both the fuel injection timing and the fuel supply quantity for particular cylinders may be controlled individually and independently from the other cylinders, while the other cylinders may then be controlled in common in respect of both the fuel injection timing and the fuel supply quantity.

Further, although the determination of time points for producing the signals corresponding to the fuel injection timing and the injection durations is carried out by counting the clock pulses produced by the clock generator at a predetermined pulse repetition rate, it is also possible to make use of the pulses produced at a repetition rate proportional to the rotating speed of the engine crankshaft. In this case, the injection timing data as well as data of the injecting duration (fuel supply quantity) are determined as a function of the crankshaft rotation angle of the engine. Further, although the intake timing reference signals for the individual cylinders are derived from the ignition signals for the other cylinders, the reference signals may be produced directly in response to the corresponding angular positions of the engine crankshaft. In any case, according to the invention, the timing for initiating the fuel supply as well as the fuel supply quantity can be selectively determined at optimum values for the individual engine cylinders on the basis of the reference rotation angle, whereby a significant improvement can be attained for the combustions which would otherwise become non-uniform among the cylinders due to the dimensional asymmetry of the intake conduits as well as difference in the density, viscosity, inertia and speed of the fuel-air mixtures supplied to the individual cylinders.

Further, the processor, the various latch circuits, counters and the like can be implemented in an extremely compact size with high reliability by application of the highly advanced recent microcomputer techniques.

What we claim is:

1. A fuel supply control apparatus for use in a multi-cylinder internal combustion engine having a single fuel injection valve for supplying fuel to all the cylinders, comprising:
   first means for generating, for each respective cylinder, a respective reference signal in response to the fuel intake stroke for that respective cylinder;
   second means for generating control signals for operating said fuel injection valve in response to said reference signals generated by said first means for every respective cylinder; and
   third means for controlling the starting time of said control signals for operating said fuel injection valve so as to supply fuel to each cylinder in accordance with the characteristics of the fuel supply path from said fuel injection valve to each cylinder, whereby a uniform distribution of fuel is achieved among the respective cylinders.

2. A fuel supply control apparatus according to claim 1, wherein said first means includes means for generating said respective reference signals in synchronism with fuel intake strokes at the respective cylinders, and said second means includes means for discriminating the reference signal corresponding to the intake stroke of each respective cylinder and means for controlling the time interval between the generation of said discriminated reference signal and the starting of the control signal for operating said fuel injection valve.

3. A fuel supply control apparatus according to claim 1, wherein said second means is arranged to control said starting time of the control signal for each cylinder independently of the starting time for the control signals for different cylinders.

4. A fuel supply control apparatus according to claim 3, wherein said first means comprises means for generating said reference signals in synchronism with fuel intake strokes at each respective cylinder, and said second means includes means for alloting said reference signals to the respective cylinders, and means for controlling the time interval between the generation of said allotted reference signal and the starting of the control signal for operating said fuel injection valve.

5. A fuel supply control apparatus according to claim 2 or 4, wherein said reference signals are generated in response to ignition signals for the cylinders.

6. A fuel supply control apparatus for use in a multi-cylinder internal combustion engine having a single fuel injection valve for supplying fuel to all the cylinders, comprising:
   means for generating fuel injection reference signals in synchronism with fuel intake strokes at every respective cylinder;
   means for allotting said reference signals to the respective cylinders;
   means for generating control signals for operating said fuel injection valve in response to said allotted reference signals; and
   control means for controlling the time interval between the generation of said allotted reference signal and the starting of the control signal for operating said fuel injection valve for supplying fuel to each cylinder independently of that supplied to other cylinders,
   whereby a uniform distribution of fuel is achieved among the respective cylinders.

7. A fuel supply control apparatus according to claim 6, wherein said control means comprises an arithmetic operation unit for calculating said time interval control quantities on a time division mode according to operating conditions of said engine, latch means provided for each of said cylinders and adapted to place therein data representing said calculated time interval for the associated cylinder, means responsive to each of said reference signals to read out said data from said latch means for the cylinder to which said reference signal is allotted, and means for operating said fuel injection valve according to said data read out from said latch means.

8. A fuel supply control apparatus according to claim 6 or 7, wherein said reference signals are generated in response to ignition signals for said cylinders.

9. A fuel supply control apparatus, for use in a multi-cylinder internal combustion engine having a plurality of cylinders and a fuel supply system of the type in which each cylinder of said plurality is supplied with fuel from the same fuel supply device, comprising:
   first means for generating, for the respective cylinders, respective reference signals in response to a prescribed state of operation of the respective cylinders;
   second means for generating, in response to said reference signals, successive control signals for operating said fuel supply device and thereby causing the supply of fuel to respective ones of said cylinders; and
   second means, coupled to said first means, for establishing the time of initiation of each respective control signal, for operating said fuel supply device to supply fuel to a respective cylinder, independently of the time of initiation of a control signal associated with another cylinder,
   whereby a uniform distribution of fuel is achieved among the respective cylinders.

10. A fuel supply control apparatus according to claim 9, wherein said control signals are generated in response to the intake strokes of the respective cylinders.

11. A fuel supply control apparatus according to claim 9, wherein said second means further includes means for establishing the duration of each respective control signal independently of that associated with another cylinder.

12. A fuel supply control apparatus according to claim 9, wherein said time of initiation of a respective control signal is controlled relative to its associated reference signal.

13. A fuel supply control apparatus according to claim 12, wherein said second means further includes means for establishing the duration of each respective control signal independently of that associated with another cylinder.

14. A fuel supply control apparatus according to claim 12, wherein said second means comprises means for establishing said time of initiation of each respective control signal in accordance with operational characteristics of the respective cylinder to which said fuel supply device supplies fuel in response to its associated respective control signal.

15. A fuel supply control apparatus according to claim 12, wherein said second means comprises means for establishing said time of occurence of the initiation of each respective control signal in accordance with the characteristics of the fuel supply path from said fuel supply device to said respective cylinder.

16. A fuel supply control apparatus, for use in a multicylinder internal combustion engine having a plurality of cylinders and a fuel supply system therefor comprising:
- first means for generating; for each respective cylinder, a respective reference signal in response to a prescribed state of the operation of said cylinder;
- second means, responsive to the respective reference signals generated by said first means, for generating successive control signals for operating said fuel supply system and thereby causing the supply of fuel to said respective cylinder; and
- third means, coupled to said second means, for establishing the time of initiation of each respective control signal, for operating said fuel supply system to supply fuel to a respective cylinder, relative to its associated reference signal, independently of the time of initiation of a control signal associated with another cylinder.

17. A fuel supply control apparatus according to claim 16, wherein said third means further comprises means for establishing the duration of each respective control signal independently of the duration of a control signal associated with another cylinder.

18. A fuel supply control apparatus according to claim 16, wherein said third means comprises means for establishing said time of initiation of each respective control signal in accordance with the characteristics of the fuel supply path from said fuel supply system to said respective cylinder.

19. For use in a fuel supply control apparatus, for use in a multicylinder internal combustion engine having a plurality of cylinders and a fuel supply system of the type in which each cylinder of said plurality is supplied with fuel from the same fuel supply device, and wherein fuel supply path characteristics of the fuel supply system are different among different ones of said cylinders, an arrangement for compensating for differences in said fuel supply path characteristics of said fuel supply system from said fuel supply device to said different ones of said cylinders and thereby attaining an optimum fuel distribution to the respective cylinders of said plurality comprising:
- first means for generating, for each respective cylinder, a respective reference signal in response to a prescribed state of the operation of said cylinder;
- second means, responsive to the respective reference signals generated by said first means, for generating successive control signals for operating said fuel supply device and thereby causing the supply of fuel to said respective cylinder; and
- third means, coupled to said second means, for establishing the time of initiation of each respective control signal, for operating said fuel supply device to supply fuel to a respective cylinder, relative to its associated reference signal, in accordance with the characteristics of the fuel supply path from said fuel supply device to said respective cylinder.

20. An arrangement according to claim 19, wherein said third means further comprises means for establishing the duration of each respective control signal independently of the duration of a control signal associated with another cylinder.

* * * * *